United States Patent Office 3,307,040
Patented Feb. 28, 1967

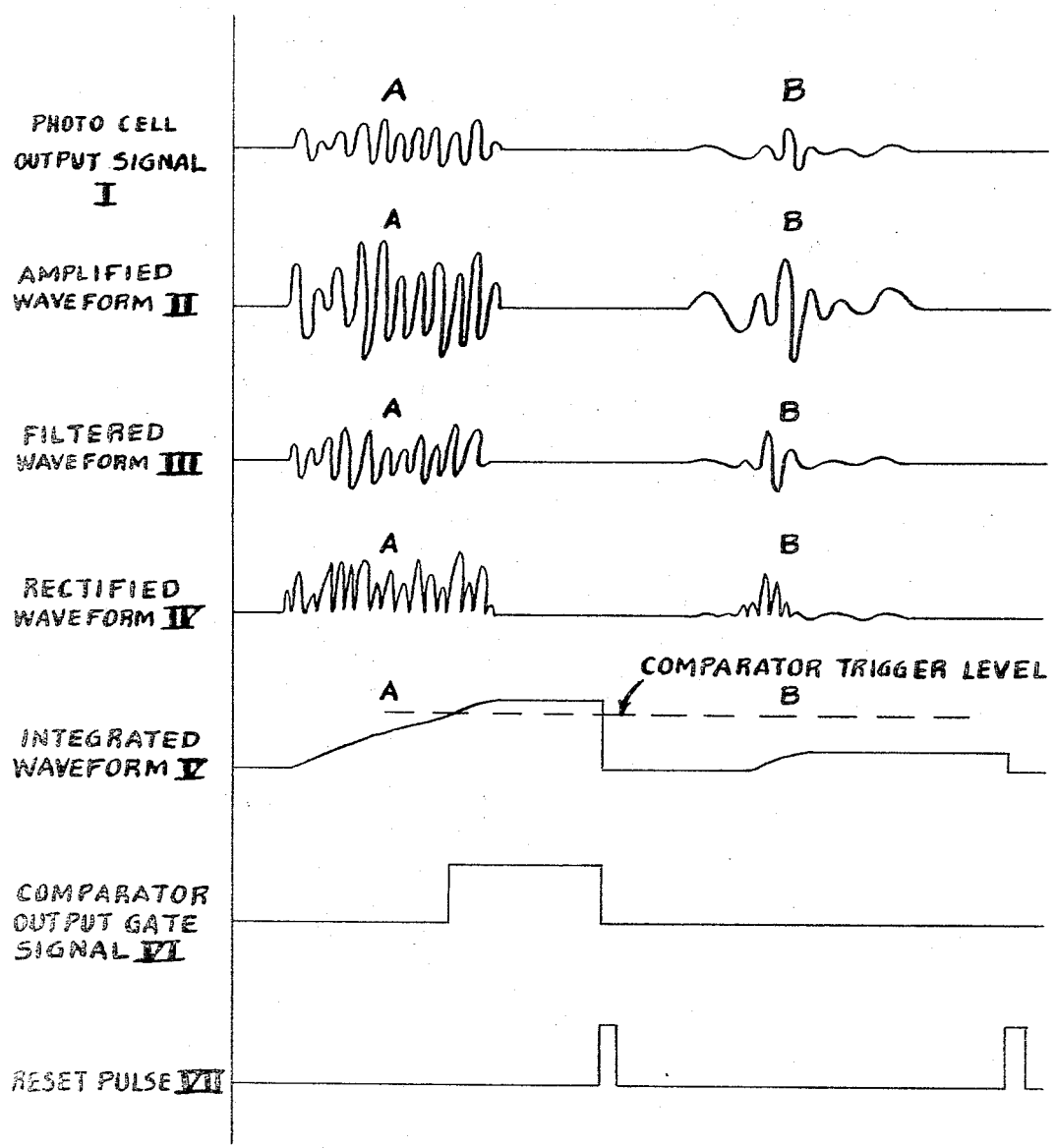

3,307,040
PHOTOELECTRIC FREQUENCY RESPONSIVE SPECKLED BOTTLE RECOGNITION APPARATUS
Paul J. Schneider, 18 9th Ave., Haddon Heights, N.J. 08035
Filed Oct. 3, 1963, Ser. No. 313,532
5 Claims. (Cl. 250—223)

There currently exists in the bottling industry a need for apparatus capable of recognizing and sorting automatically bottles of different types. The differences to be recognized may be in weight, or size, or shape, or color, or other optical density or other properties. Sometimes, it is necessary to identify and distinguish between bottles which are of substantially the same weight, size, shape and color, but which differ in that one type of bottle has an essentially smooth outer surface while the other type has a rough outer surface, such for example as a fine pebble grain pattern molded into the surface.

The object of the invention of the present application is to provide apparatus capable of distinguishing between two types of bottles which may be generally similar in all respects except that one has a smooth outer surface while the other has a fine pattern of some sort molded into its outer surface.

The apparatus provided by the present invention employs light sources, optic elements, light sensitive devices, and electronic circuits to develop recognition signals which indicate whether or not the bottle being inspected is of one type or the other. Such recognition signal may then be used to operate a sorting gate, but the particular form of sorting gate used is not part of the present invention.

The present invention will be clear from a consideration of the following description, taken together with the drawing in which;

FIG. 3 represents a series of waveforms which will be helpful in explaining the operation of the system of the present application.

Figure 1:
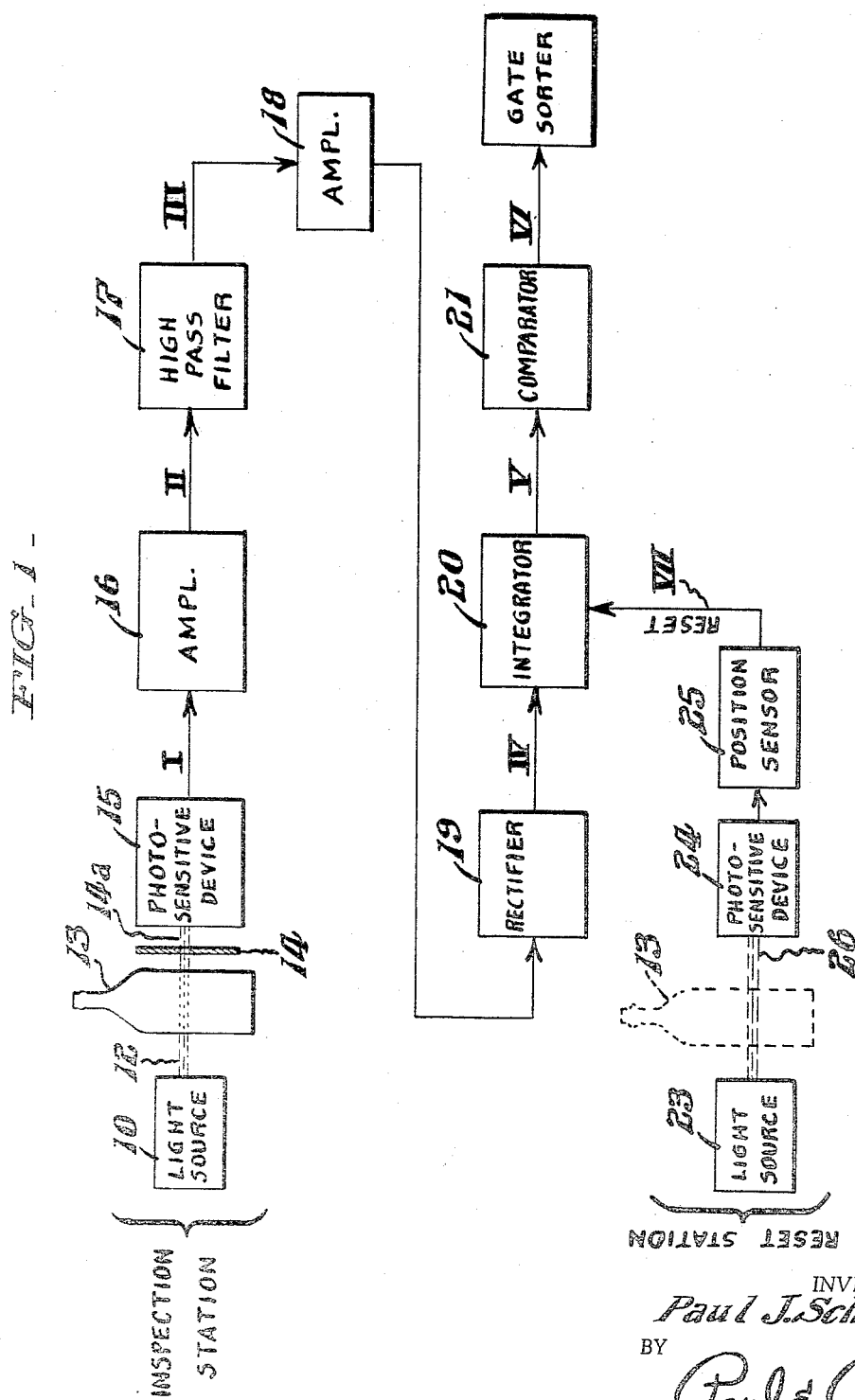
FIG. 1 is a block diagram of a system for inspecting and developing output signals differentiating between smooth and rough surface bottles.

Referring now to FIG. 1, an inspection station is shown which includes a source 10 for producing a beam of light 12. Source 10 is preferably but not necessarily energized by direct current in order to avoid sixty-cycle modulation of the intensity of the light beam 12. In some cases, however, the signal developed may be adequately large to permit the use of alternating current energization of the light source.

The beam of light 12 passes through the aperture 14a of an aperture plate 14 and is received by a photosensitive pickup device 15 positioned behind the aperture plate and closely adjacent thereto. Device 15 may preferably be a phototransistor of a type capable of responding faithfully to rapid variations in light intensity and of developing in response thereto electrical signals corresponding to the light variations.

In FIG. 1, a bottle 13 is represented at the inspection station and is assumed to be moving through the beam of light 12, as on a conveyor not shown. Bottle 13 will be assumed to be a white glass bottle whose outer surface is molded into a fine design, or bottle 13 may have a smooth outer surface. For convenience, the rough surfaced bottle will be identified herein as type 13A while the smooth surfaced bottle will be identified as type 13B.

If the bottle passing through the light beam 12 is type 13A, the light beam will be modulated at a relatively high frequency by the pebble grain pattern, or other fine design, and the waveform of the electrical signal output of the photosensitive pickup device 15 will have a high-frequency content. Such a waveform is depicted in FIG. 3 as waveform IA. If, on the other hand, the bottle being transported through the light beam 12 is a type 13B bottle, i.e. a bottle having a smooth outer surface, then the beam will be modulated at a relatively low frequency, as by the leading edge portion, the center portion, and the rear edge portion of the bottle as it passes through the beam 12, and the photosensitive pickup device 15 will produce an electrical output signal having relatively low frequency variations, except for possible spurious pulses. Such a signal is depicted in FIG. 3 by the waveform IB.

Figure 2:
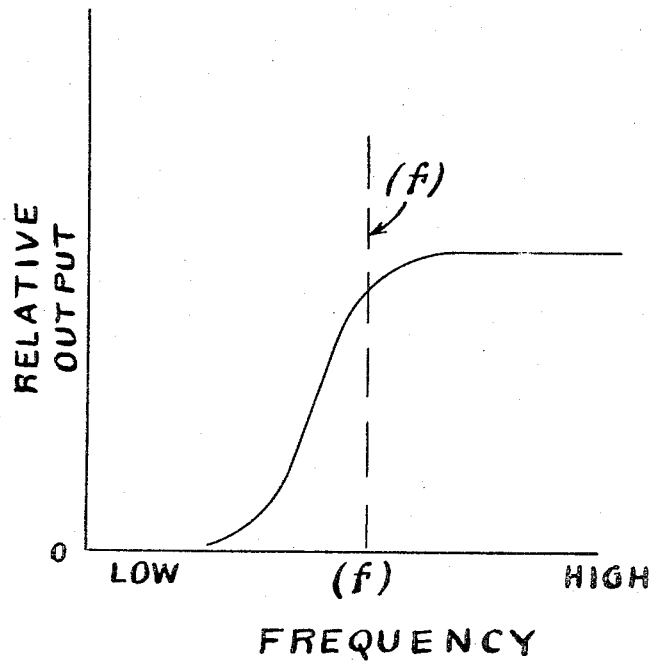
FIG. 2 is a frequency curve.

The output signal IA or IB delivered by the photosensitive device 15 may preferably be amplified, as by a transistorized amplifier 16, to produce an amplified signal having the waveforms IIA or IIB, such as represented in FIG. 3. This amplified signal is then applied to a high pass filter 17 which may preferably have a frequency response characteristic such as is represented by the curve shown in FIG. 2. As there depicted, frequencies above the cutoff frequency $(f)$ are passed with but little attenuation, while frequencies below the cutoff frequency $(f)$ are rather heavily attenuated.

The value of the cutoff frequency $(f)$ selected for the high pass filter 17 is dependent upon the speed at which the bottles are conveyed through the inspection station and upon the characteristic of the pattern which is molded into the surface of the rough-surfaced bottle. The important characteristics of the pattern, so far as the present application is concerned, is the spacing between the adjacent ridges and valleys in the rough surface of the bottle, the closer the spacing, the higher the frequency of the signal generated by the photosensitive pickup device 15.

The frequency $(f)$ may be approximated from the following relationship:

$$(f) = (V/Wp) - K$$

where:
$(f)$ = the filter cutoff frequency in cycles per second.
$V$ = the velocity of the bottle through the beam in inches per second.
$Wp$ = the pattern width, i.e. the distance between successive repetitions of ridges and valleys in the pattern as measured in inches.
$K$ = an arbitrary constant used to insure that the filter cutoff frequency lies below the frequency of response.
Let
$$K = (\tfrac{1}{3})(V/Wp)$$

For example, if the bottles are moving past through the light beam 12 at a velocity V equal to 36 inches per second, and the distance between successive ridges of the pattern on the bottle is 0.12 inch,
Then $$(f) = \frac{36}{0.12} - (\tfrac{1}{3})(36/0.12) = 300 - 100 = 200$$

cycles per second.

It will be understood that the foregoing is merely an example of a typical set of operating parameters, and are not a limitation on the system being described.

The high frequency output of the high pass filter 17 (waveforms IIIA or IIIB in FIG. 3) is amplified in amplifier 18 and applied to rectifier 19 to produce the rectified signal waveforms such as are represented in FIG. 3 by waveforms IVA or IVB. This rectified signal is applied to an integrator circuit 20 to produce an output signal having a ramp function characteristic such as indicated by waveforms VA or VB in FIG. 3. This ramp function signal VA or VB is applied to a comparator 21, which preferably, but not necessarily, may be a Schmitt trigger circuit. When the level of the ramp edge of the input signal to the comparator 21 reaches a predetermined voltage level, the comparator 21 will trigger and produce an output gate signal, such as is represented by waveform VIA in FIG. 3. This gate signal will exist until the integrator output signal to the comparator 21 drops below the trigger voltage level of the comparator.

The integrator 20 is then reset, as by a reset pulse, represented by waveform VIIA or VIIB of FIG. 3. This reset pulse may be developed by means actuated by the bottle 13 after it has left the inspection station. In the system of FIG. 1, a second light source 23 is positioned to project a second beam of light 26 across the path of the bottle so that the bottle intercepts the beam 26 shortly after the bottle leaves the inspection station. The passage of the bottle through the light beam 26 is sensed by the photosensitive pickup device 24 and an electrical output signal is developed by device 24 which is applied to the position sensor 25. Position sensor 25 may preferably, but not necessarily, include a differential amplifier and a Schmitt trigger circuit which, in response to the signal from the photosensitive pickup device 24, deliver a reset pulse to the integrator 20 to reset the integrator. It will be understood that such a reset pulse is generated by both the rough surfaced type 13A bottle and also by the smooth surfaced type 13B bottle, as indicated in FIG. 3 by the waveforms VIIA and VIIB.

It will also be understood that in lieu of the second light beam 26 and its associated circuitry, the reset pulse may be developed by a mechanical switch so positioned as to be actuated by the bottle after it leaves the inspection station.

Integrator 20 may preferably, although not necessarily, be a high gain transistorized operational amplifier which incorporates capacitive feed-back so that the circuit acts as an integrator. This technique is well known in electrical engineering practices.

The time constants of the integrating and resetting circuits are adjusted to assure the proper operation of the system for the particular conditions which exist. The factors having a bearing include bottle size, bottle velocity through the station, the design of rectifier 19, the output frequency and amplitude of the rectified signal, and the triggering level of the comparator 21.

The output pulse (waveform VI) from the comparator 21 is preferably used to control the operation of an electro-mechanical sorting gate. This gate, which forms no part of the present invention, controls the course of the bottles after they have passed through the inspection and reset stations.

The operation of the system of the present application is by now probably clear. It will be understood that the principal function of the system is to sort automatically a mixture of smooth surfaced bottles and rough surfaced bottles having a fine pattern molded into their exterior surface.

The mixture of bottles is moved along by a conveyor belt or other transport medium and the bottles are presented successively one by one to the inspection station, the bottles moving through the light beam 12 at a selected and relatively constant speed. If the bottle passing through the beam 12 has a molded fine pattern on its surface, the beam 12 will be modulated at a relatively high frequency and a relatively high frequency electrical signal will be generated by the photosensitive pickup device 15. Such a high frequency signal is represented in FIG. 3 by the waveform IA. The predominant frequency of the waveform IA is above the cut-off frequency ($f$) of the high pass filter 17, and this signal is accordingly applied to the rectifier 19.

If, on the other hand, the bottle is a plain surface bottle, there will be few and slow variations in the light beam 12, and the waveform of the output signal of the photosensitive pickup device 15 will be a low frequency low amplitude, except possibly for a spurious spike due to a spot of dirt or other obstruction. Such an output signal is represented in FIG. 3 by the waveform IB.

The electrical signals delivered by the photosensitive pickup device 15 are amplified, and those high frequency components of the signal whose frequencies are above the cutoff frequency ($f$) of the high pass filter 17 are passed with relatively little attenuation through the filter 17, then further amplified in amplifier 18, and then rectified by rectifier 19. Rectifier 19 may preferably be a full-wave rectifier. Its output is represented in FIG. 3 by the waveforms IVA or IVB, according to whether the bottle is a speckled or a smooth surface bottle.

The rectified output signal, waveform IVA or IVB, as the case may be, is applied to integrator 20 and ramp function signals such as VA or VB are produced. If the rectified signal is a high frequency signal, such as represented by the waveform IVA of FIG. 3, the ramp function signal attains an amplitude which rises above the trigger level of the comparator circuit 21, and the comparator 21, which may preferably be a Schmitt trigger circuit, is triggered and an output gate pulse, such as is represented by the pulse VI of FIG. 3, is generated. If, on the other hand, the rectified signal has only low amplitude or only few frequency variations, such as is represented in FIG. 3 by the waveform IVB, the area under the pulses of the waveform IVB will be relatively small and the ramp function signal VB generated will fail to rise to the trigger level of the comparator 21, and no output signal will be generated. Thus, the generation of an output pulse signal VI by the comparator circuit 21 indicates that the bottle passing through the inspection station is a rough surfaced or speckled bottle, and not a smooth surfaced bottle. This output pulse VI may then be used to actuate a sorting gate, thereby to separate the speckled bottles from the smooth bottles.

The system is preferably reset after each bottle has passed through the inspection station, irrespective of whether it was a rough surfaced or a smooth surfaced bottle.

While the preferred embodiment of this invention has been described in some detail, it will be obvious to one skilled in the art that various modifications may be made without departing from the invention as hereinafter claimed.

Having described my invention, I claim:

1. Apparatus for recognizing and distinguishing between light transmissive unit articles according to whether the article has a rough or a smooth surface, said apparatus comprising; means for generating a light beam; a photosensitive device positioned to receive light from said light beam and to generate electrical signals in response thereto; means for moving said unit articles to be recognized one by one transversely through said light beam at a relatively constant speed to vary the light received by said photosensitive device at a frequency dependent upon whether said article has a rough or a smooth surface, said photosensitive device generating electrical signals at a frequency corresponding to the frequency of the light variations; high pass filter means adapted to pass with but little attenuation the high frequency signals generated by a rough surfaced bottle but adapted to attenuate heavily the low frequency signals generated by a smooth surfaced bottle; rectifier means; means, including said high pass filter means, for applying said generated electrical signals to said rectifier means; an integrating circuit; means for applying the output of said rectifier means to said integrating circuit to develop a signal having a ramp function characteristic; comparator means having a reference level; and means for applying said ramp function output signal from said integrating circuit to said comparator means to develop an output signal only when the ramp function signal exceeds said reference level, the development of an output signal by said comparator means indicating that a rough surfaced bottle has passed through said light beam.

2. Apparatus as claimed in claim 1 further characterized by the provision of gate means, and means for applying the output signal from said comparator means to said gate means to actuate said gate means for separating said rough surfaced bottles from said smooth surfaced bottles.

3. Apparatus according to claim 2 characterized in that reset means are provided adapted to be actuated by said bottle after it is passed through said light beam.

4. Apparatus according to claim 3 characterized in that said reset means includes means for generating a second light beam, a second photosensitive device positioned to receive said second light beam, said second light beam and said second photosensitive device being positioned to be intercepted by said bottle after it has passed through said first mentioned light beam, and means coupled to said second photosensitive device and to said integrating circuit for utilizing the output of said second photosensitive device to reset said integrating circuit.

5. Apparatus according to claim 3 characterized in that aperture means are provided in the light beam path between the bottle path and said first-mentioned photosensitive device.

References Cited by the Examiner

UNITED STATES PATENTS

| | | | |
|---|---|---|---|
| 2,821,302 | 1/1958 | Fowler et al. | 88—14 |
| 3,008,577 | 11/1961 | Miles | 209—111 |
| 3,056,032 | 9/1962 | Cannon | 250—219 |
| 3,096,443 | 7/1963 | Laycak | 250—219 |
| 3,105,151 | 9/1963 | Scholten et al. | 88—14 |
| 3,217,877 | 11/1965 | Honjyo et al. | 88—14 |

RALPH G. NILSON, *Primary Examiner.*

W. STOLWEIN, M. A. LEAVITT, *Assistant Examiners.*